April 17, 1956      E. D. IANNETTI      2,742,073
QUICK ATTACHABLE NUT AND BOLT ASSEMBLY
Filed June 20, 1952
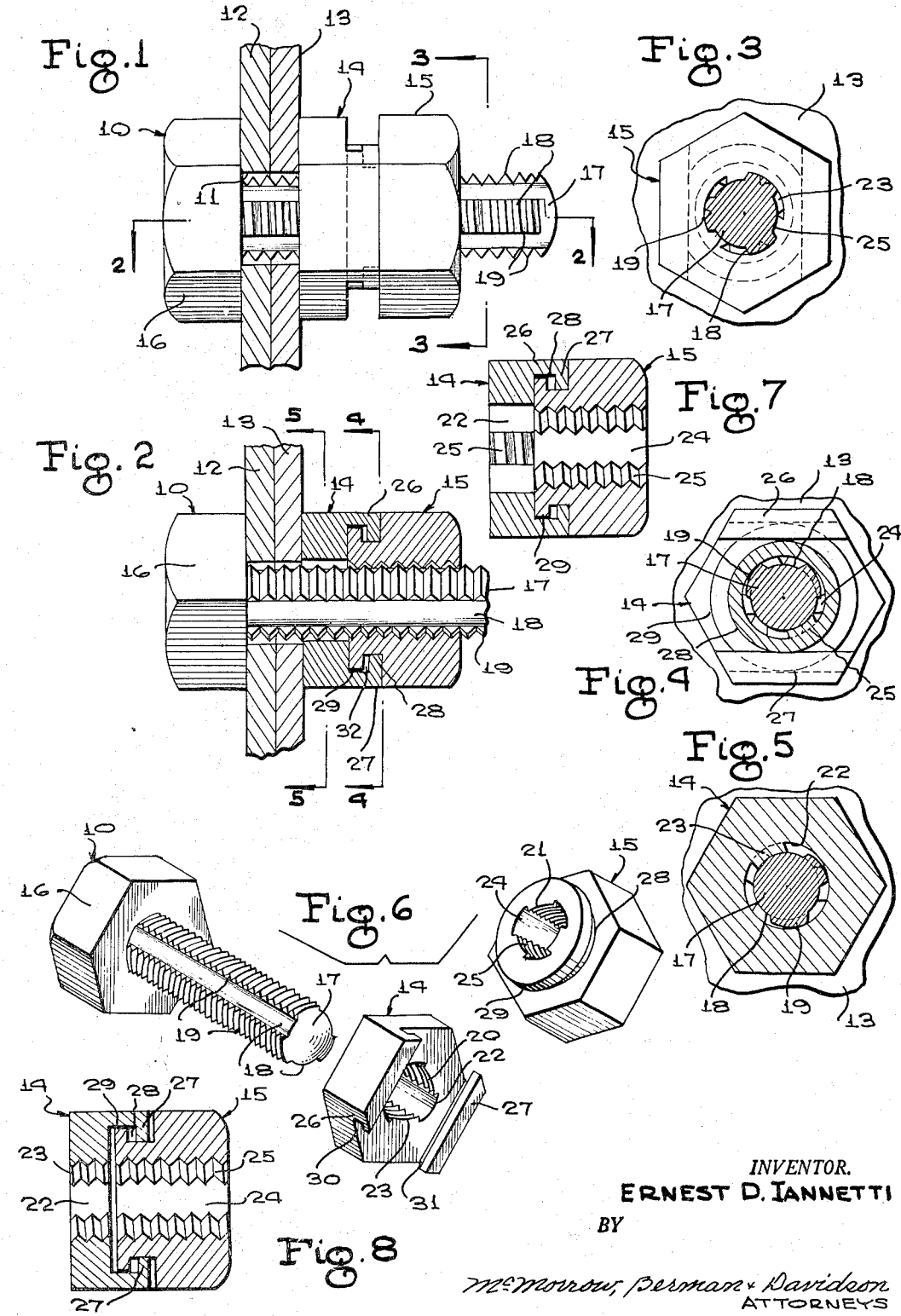
INVENTOR.
ERNEST D. IANNETTI
BY
McMorrow, Berman & Davidson
ATTORNEYS

United States Patent Office 2,742,073
Patented Apr. 17, 1956

2,742,073

QUICK ATTACHABLE NUT AND BOLT ASSEMBLY

Ernest D. Iannetti, Osterburg, Pa.

Application June 20, 1952, Serial No. 294,629

3 Claims. (Cl. 151—15)

This invention relates to quick attachable nut and bolt assemblies and more particularly to a quick attachable nut and bolt assembly including a bolt and interconnected nuts which can be slid longitudinally of the bolt, continuously threaded along the bolt and locked in adjusted position on the bolt.

It is among the objects of the invention to provide an improved nut and bolt assembly including a screw threaded bolt or stud and interconnected nuts which, when in one rotational position relative to each other, can be slid along the bolt without rotation until brought into engagement with a work piece through which the bolt extends, and when in a different rotational position relative to each other, can be continuously threaded along the bolt to tighten the bolt in the work piece, and if necessary, compress the work piece or work pieces; in which the nuts can be relatively rotated to lock them in adjusted position on the bolt without the use of lock washers or other fasteners; in which both nuts can be turned simultaneously with the same wrench; and which is simple and durable in construction, economical to manufacture, easy to use, and positive and effective in use.

Other objects and advantages will become apparent from a consideration of the following description and the appended claims in conjunction with the accompanying drawing wherein:

Figure 1 is a side elevational view of a nut and bolt assembly illustrative of the invention in operative assembly with a work piece shown in cross section;

Figure 2 is a cross sectional view on the line 2—2 Figure 1;

Figure 3 is a transverse cross sectional view on line 3—3 of Figure 1;

Figure 4 is a transverse cross sectional view on the line 4—4 of Figure 2;

Figure 5 is a transverse cross sectional view on the line 5—5 of Figure 2;

Figure 6 is a perspective exploded view of the nut and bolt assembly;

Figure 7 is a longitudinal medial cross sectional view of the nut assembly with the nuts in relative position to thread along the bolt; and Figure 8 is a cross sectional view similar to Figure 7 but with the nuts in relative position to slide longitudinally of the bolt.

With continued reference to the drawing, the numeral 10 generally indicates a bolt or stud extending through an aperture 11 in a work piece comprising a pair of plates 12 and 13 and the numerals 14 and 15 generally indicate hexagonal nuts arranged in confronting face to face relation threaded onto the shank of the bolt.

In the arrangement illustrated the bolt is provided at one end with a polygonal head 16 but it is to be understood that the head 16 may be a nut threaded onto a screw threaded stud without in any way exceeding the scope of the invention. The bolt has an externally screw threaded shank 17 provided with flat grooves 18 extending longitudinally of the shank from one end thereof to the other. These grooves 18 have a depth substantially equal to the depth of the screw threads on the shank and the grooves 18 and screw threaded portions 19 between the grooves have substantially the same width circumferentially of the shank. In the arrangement illustrated there are three grooves the longitudinal center lines of which are spaced apart one hundred and twenty degrees from each other and three screw threaded portions 19 the longitudinal center lines of which are also spaced apart one hundred and twenty degrees, the angular interval between the longitudinal center line of a groove and the longitudinal center line of an adjacent screw threaded portion 19 being sixty degrees.

The nuts 14 and 15, as above stated, are hexagonal in shape and are of the same size and each nut has a bore, as indicated at 20 and 21 extending coaxially therethrough and provided with screw threads which match the screw threads on the bolt shank 17.

The nut 14 is provided within the bore thereof with angularly spaced apart, flat grooves 22 which extend longitudinally of the bore 20 from one end to the other and have a depth substantially equal to the depth of the screw threads in the bore. The grooves 22 and the screw threaded portions 23 therebetween all have substantially the same width circumferentially of the bore 20 and there are three grooves equally spaced apart and three screw threaded portions, the grooves 22 and screw threaded portions 23 being complementary to the grooves 18 and screw threaded portions 19 on the bolt shank 17.

The nut 15 is provided with screw threads in its bore 21 and with flat grooves 24 extending longitudinally of the bore 21 in angularly spaced apart relationship. The grooves 24 also have a depth substantially equal to the depth of the screw threads in the bore 21 and the grooves 24 and screw threaded portions 25 therebetween all have substantially the same width circumferentially of the bore 21 and are complementary to the grooves 18 and screw threaded portions 19 on the bolt shank.

The flat grooves in the nuts 14 and 15 extend over angular intervals of approximately sixty degrees and the screw threaded portions between the grooves extend over the same angular intervals and the grooves and screw threaded portions are so related to the faces of the hexagonal nuts that when the nuts are in one predetermined rotational position the grooves in one nut are in longitudinal alignment with corresponding grooves in the other nut and the faces of the two nuts are flush, or in alignment, as illustrated in Figure 8, and, when the two nuts are in a different rotational position relative to each other the grooves in one nut are in longitudinal alignment with the screw threaded portions in the other nut and corresponding faces of the two nuts are flush or in alignment, as illustrated in Figure 7.

Means adapted to maintain the nuts 14 and 15 substantially in face to face engagement with the screw threads of the threaded portions 23 and 25 of the nuts 14 and 15 substantially in phase when they are in axial alignment is provided. Such means embodies an open ended undercut guideway on the confronting face of the nut 14 which extends transversely of such face as shown in Figure 6, and a cylindrical projection 28 having a radially extending flange 29 on the confronting face of the nut 15, the flange 29 being slidably and rotatably received in the guideway. The guideway on the confronting face of the nut 14, Figure 6, is formed by axially extending portions 26 and 27 with radially inwardly projecting lugs 30 and 31 on the end thereof, the portions 26 and 27 each extending from one entire face of the hexagonal surface of the nut 14 and are diametrically opposed to each other. The inside surfaces of the portions 26 and 27 and of the lugs 30 and 31 are parallel with the outer surfaces forming continuations of the sides of the nut 14.

Before the nuts 14 and 15 are threaded onto the shank 17 of the bolt 10, the flange 29 of the nut 15 is slipped into the guideway on the nut 14 through one of its open ends and then the nut 15 rotated relative to the nut 14 until its grooves 24 are in axial alignment with the grooves 22 of the nut 14. The thus assembled nuts 14 and 15 are then placed on the bolt shank 17 in a manner such that the screw threaded portions 19 on the bolt shank 17 are received in the axially aligned grooves 22 and 24 of the nuts 14 and 15. It is to be noted that with the screw threads of the threaded portions 23 and 25 of the nuts 14 and 15 in axial alignment the exterior faces of the nuts 14 and 15 are also in axial alignment and the means on the confronting faces of the nuts 14 and 15, namely, the flange 29 on the nut 15 and the guideway on the nut 14 thus to maintain the nuts 14 and 15 substantially in face to face engagement with the screw threads of the threaded portions 23 and 25 of the nuts 14 and 15 substantially in phase. The nut 14 is then held in position and the nut 15 rotated through an angle of sixty degrees relative to the nut 14 so that the screw threaded portions 25 of the nut 15 span the grooves 22 in the nut 14 and the two nuts provide, in effect, a continuously threaded nut which can be advanced along the bolt shank by rotating the two nuts simultaneously. The two nuts are then rotated together, preferably by a single wrench, until the bolt is tightened in the work piece or, if necessary, until the work piece is suitably compressed. For example, if the two plates 12 and 13 illustrated as the work piece were separated or warped, the two nuts 14 and 15 can be advanced together along the bolt shank until the two plates are compressed together between the head 16 of the bolt and the nut 14.

It will be further noted that the clearance between the threads of the bolt shank 17 and of the nuts 14 and 15 and the clearance 32, Figure 2, provided by the above described maintaining means permit the nuts 14 and 15 to be rotated relative to each other with the nut threads remaining substantially free on the threads of the bolt shank 17 for 60° whereby the face to face engagement of the nuts 14 and 15 prevents further relative rotation of the nuts as much as 60°.

After the nuts have been tightened on the bolt shank 17 the nut 15 may be rotated relative to the nut 14 through an angle less than sixty degrees while the screw threaded portions of both nuts are in engagement with the screw threaded portions on the bolt shank to firmly lock the nuts in adjusted position on the bolt shank. This locking feature of the two nuts eliminates the necessity of providing lock washers or other fastening means for holding the nuts in position on the bolt after they have been tightened thereon.

In removing the nuts from the bolt, after the nut 15 has been rotated relative to the nut 14 a distance sufficient to release the nuts, and the nuts are then threaded outwardly together on the bolt shank until they are loosened from the work piece, one of the nuts is rotated relative to the other until the grooves in one nut are brought into longitudinal alignment with the corresponding grooves in the other nut and the screw threaded portions of both nuts are brought into the grooves 18 in the bolt shank, whereupon both nuts may be slipped off of the bolt shank and do not have to be threaded outwardly of the bolt shank until they leave the outer end of the latter.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A nut and bolt assembly comprising a bolt having a screw threaded shank and angularly spaced apart grooves extending longitudinally thereof, said grooves and the screw threaded portions of said shank therebetween being of substantially equal width circumferentially of said shank, and a pair of hexagonal nuts arranged in confronting face to face relation threaded onto said shank, each of said nuts having an axial bore provided with screw threads and angularly spaced apart grooves extending longitudinally of said bore, the grooves in said nuts and the screw threaded portions therebetween having widths circumferentially of said bores substantially equal to each other and to the widths of the grooves and screw threaded portions on said shank, the threads of the threaded portions on the nuts and shank being the same, means adapted to maintain said nuts substantially in face to face engagement with the screw threads of said nuts substantially in phase when they are in axial alignment, the exterior faces of said nuts being in alignment when the screw threaded portion of the nuts are in axial alignment, the clearance between said shank and nut threads and the clearance provided by said maintaining means permitting said nuts to be rotated relative to each other with the nut threads remaining substantially free on the shank threads for 60° and whereby said face to face engagement will prevent further relative rotation of said nuts as much as 60°.

2. The assembly according to claim 1 wherein said means embodies an open ended undercut guideway in the confronting face of one of said nuts and extending transversely of said face and a cylindrical projection having a radially extending flange on the confronting face of the other of said nuts slidably and rotatably received in said guideway.

3. The assembly according to claim 2 in which the open ended guideway is formed by axially extending portions with radially inwardly projecting lugs on the ends thereof, said portions each extending from one entire face of the hexagonal surface of the nut and being diametrically opposed to each other, the inside surfaces of said portions and lugs being parallel and with the outer surfaces forming continuations of the sides of the nut.

References Cited in the file of this patent

UNITED STATES PATENTS

| | | |
|---|---|---|
| 656,956 | Eibee | Aug. 28, 1900 |
| 803,090 | Bradford | Oct. 31, 1905 |
| 1,035,118 | Goldsman | Aug. 6, 1912 |
| 1,391,633 | Hazelton | Sept. 20, 1921 |
| 1,432,050 | Broderick | Oct. 17, 1922 |
| 1,592,093 | Foucault | July 13, 1926 |
| 1,747,250 | Kozma | Feb. 18, 1930 |
| 1,916,930 | Lyness | July 4, 1933 |
| 2,286,105 | Quinn | June 9, 1942 |

FOREIGN PATENTS

| | | |
|---|---|---|
| 21,526 | Great Britain | Nov. 25, 1892 |